US008230339B2

(12) United States Patent
Watanabe et al.

(10) Patent No.: US 8,230,339 B2
(45) Date of Patent: Jul. 24, 2012

(54) HIERARCHICAL DATA DISPLAY

(75) Inventors: Andrew Tohru Watanabe, Berkeley, CA (US); Vincent Hardy, Palo Alto, CA (US); Jacques Vigeant, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 12/715,677

(22) Filed: Mar. 2, 2010

(65) Prior Publication Data

US 2011/0219324 A1    Sep. 8, 2011

(51) Int. Cl.
*G06F 3/00* (2006.01)
*G06F 3/048* (2006.01)
(52) U.S. Cl. .............................. 715/713; 715/834
(58) Field of Classification Search .............. 715/713, 715/834; 705/1.1
See application file for complete search history.

(56) References Cited

U.S. PATENT DOCUMENTS

| | | | |
|---|---|---|---|
| 5,798,760 A * | 8/1998 | Vayda et al. | 715/834 |
| 6,219,053 B1 * | 4/2001 | Tachibana et al. | 715/835 |
| 6,359,635 B1 * | 3/2002 | Perttunen | 715/834 |
| 7,346,858 B1 | 3/2008 | Berg et al. | |
| 7,484,185 B2 | 1/2009 | Farrington et al. | |
| 7,516,419 B2 * | 4/2009 | Petro et al. | 715/834 |
| 7,580,938 B1 | 8/2009 | Pai et al. | |
| 7,603,367 B1 | 10/2009 | Kanter et al. | |
| 7,644,372 B2 * | 1/2010 | Russo | 715/834 |
| 7,921,379 B1 * | 4/2011 | Ko | 715/834 |
| 7,992,102 B1 * | 8/2011 | De Angelo | 715/834 |
| 2003/0210284 A1 * | 11/2003 | Vandruff et al. | 345/853 |
| 2005/0010955 A1 * | 1/2005 | Elia et al. | 725/88 |
| 2007/0005477 A1 * | 1/2007 | McAtamney | 705/35 |
| 2007/0268300 A1 * | 11/2007 | Janet et al. | 345/581 |
| 2008/0016474 A1 | 1/2008 | Guido et al. | |
| 2009/0228471 A1 | 9/2009 | Dawson et al. | |
| 2010/0229130 A1 * | 9/2010 | Edge et al. | 715/863 |

OTHER PUBLICATIONS

Sheth, N., Borner, K., Baumgartner, J., Mane, K., Wernert, E. InfoVis 2003 Contest—Treemap, Radial Tree and 3D Tree Visualizations 2003 13 pages.*
John Stasko, Eugene Zhang, Focus+Context Display and Navigation Techniques for Enhancing Radial, Space-Filling Hierarchy Visualizations, Proceedings of the IEEE Symposium on Information Vizualization 2000, p. 57, Oct. 9-10, 2000.*

(Continued)

*Primary Examiner* — William Bashore
*Assistant Examiner* — Andrea Long
(74) *Attorney, Agent, or Firm* — Squire Sanders (US) LLP

(57) ABSTRACT

A graphical hierarchical data wheel for displaying hierarchical nodes includes a top level circle on a central axis of the wheel representing a top level node. The wheel further includes a first concentric ring adjacent to the top level circle and comprising a plurality of first level segments, each representing a first level node. The size of each first level segment is proportional to a weight of the corresponding first level node. The wheel further includes a second concentric ring having a larger radius than the first concentric ring and adjacent to the first concentric ring, and comprising a plurality of second level segments, each representing a second level node. The size of each of the second level segments is proportional to the weight of the corresponding second level node. The wheel may include additional concentric rings as needed, and depending on the resolution and size of the display.

17 Claims, 12 Drawing Sheets

OTHER PUBLICATIONS

Burch M., Diehl S.: Timeradartrees: Visualizing dynamic compound digraphs. In Proceedings of Tenth Joint Eurographics/IEEE-VGTC Symposium on Visualization (Euro-Vis'2008), Eindhoven, The Netherlands (2008), Eurographics Association.*

G.M. Draper and R.F. Riesenfeld, "Interactive Fan Charts: A Space-Saving Technique for Genealogical Graph Exploration," Proc. Eighth Ann. Workshop Technology for Family History and Genealogical Research, 2008.*

Oracle; "Information You Can Use"; copyright 2005; pp. 1-5; http://www.oracle.com/media/peoplesoft/en/pdf/brochures/e_epm_sb_scorecard_51905.pdf.

Christopher Collins et al.; "DocuBurst: Visualizing Document Content using Language Structure"; http://faculty.uoit.ca/collins/research/docuburst/index.html; Jul. 7, 2009.

Nihar Sheth et al.; "Treemap, Radial Tree, and 3D Tree Visualizations", IEEE Information Visualization Conference, pp. 128-129, 2003.

* cited by examiner

HIERARCHICAL DATA DISPLAY

FIELD

One embodiment is directed generally to a graphical display, and more particularly to a graphical display for displaying hierarchical data.

BACKGROUND INFORMATION

A wide variety of computer operating systems and computer application programs incorporate, display and/or perform operations on data or information that is hierarchical in nature. For example, most computer operating systems provide users access to a hierarchy of directories and sub-directories where documents, programs and/or other information are stored. Many computer e-mail systems likewise provide a hierarchy of folders and/or sub-folders in which e-mail messages may be stored. Organizer applications typically allow a user to establish task listings and/or store other forms of data which, once again, may be hierarchical in nature. Business Intelligence ("BI") systems display overall objectives and sub-objectives in a hierarchical manner within a dashboard. The number and variety of computer systems and programs that store and/or manipulate hierarchical data sets continues to increase as computer processing applications proliferate.

With the advent and expanded use of graphical user interfaces over the last two decades, it has become possible to display all or part of hierarchical data sets to the user of a computer via a "tree diagram" representation. Tree diagrams are particularly useful in displaying hierarchical data as the levels of the tree diagram visually depict the location of each piece of data in a way that quickly and intuitively conveys to the user both the location of the data within the hierarchy and the relationship of that data to other data in the hierarchy. Additionally, the hierarchical structure of a tree diagram may allow the user to more quickly and efficiently peruse the data, such as by reviewing the entries at the higher levels to locate particular branches which are most likely to contain the information of interest. A user also typically can "expand" or "collapse" the tree diagram at various points (i.e., displaying or hiding information in the higher levels of the tree) to further facilitate viewing the hierarchical data. Both custom programs and tree diagram objects are known in the prior art for providing a tree diagram graphical user interface to a user.

As one example of a tree diagram, FIG. 1 illustrates a prior art "strategy tree" for a BI dashboard. Tree 100 includes an overall "strategy" or top level node 102. Tree 100 further includes first level "objectives" or first level nodes 105-108, and second level objectives or second level nodes 110-112. For a BI tree, each node ultimately ends with one or more key performance indicators ("KPI"s) that are the actual parameters that feed into the objectives. Each of the KPIs and objectives ultimately roll-up to strategy node 102.

One problem with a tree such as tree 100 is that as the number of levels of objectives increase, it is not possible to display all of the objectives on a single screen. Another problem is that the relative weight of each of the objectives is not readily ascertainable. For example, objective 105 may contribute 10% of strategy 102, while objective 107 may contribute 70%. However, the relative percentage is not easily detected when viewing tree 100.

SUMMARY

One embodiment is a graphical hierarchical data wheel for displaying hierarchical nodes. The wheel includes a top level circle on a central axis of the wheel representing a top level node. The wheel further includes a first concentric ring adjacent to the top level circle and comprising a plurality of first level segments, each representing a first level node. The size of each first level segment is proportional to a weight of the corresponding first level node. The wheel further includes a second concentric ring having a larger radius than the first concentric ring and adjacent to the first concentric ring, and comprising a plurality of second level segments, each representing a second level node. The size of each of the second level segments is proportional to the weight of the corresponding second level node. The wheel may include additional concentric rings as needed, and depending on the resolution and size of the display.

DETAILED DESCRIPTION

One embodiment is a hierarchical data circle or "wheel" that displays hierarchical nodes as weighted sectors of the wheel and additional levels as concentric circles with sectors representing the level's nodes. The data wheel provides for a high density of information and provides a easy understanding of the position, status, and relevance of a node in the hierarchy.

Figure 1:
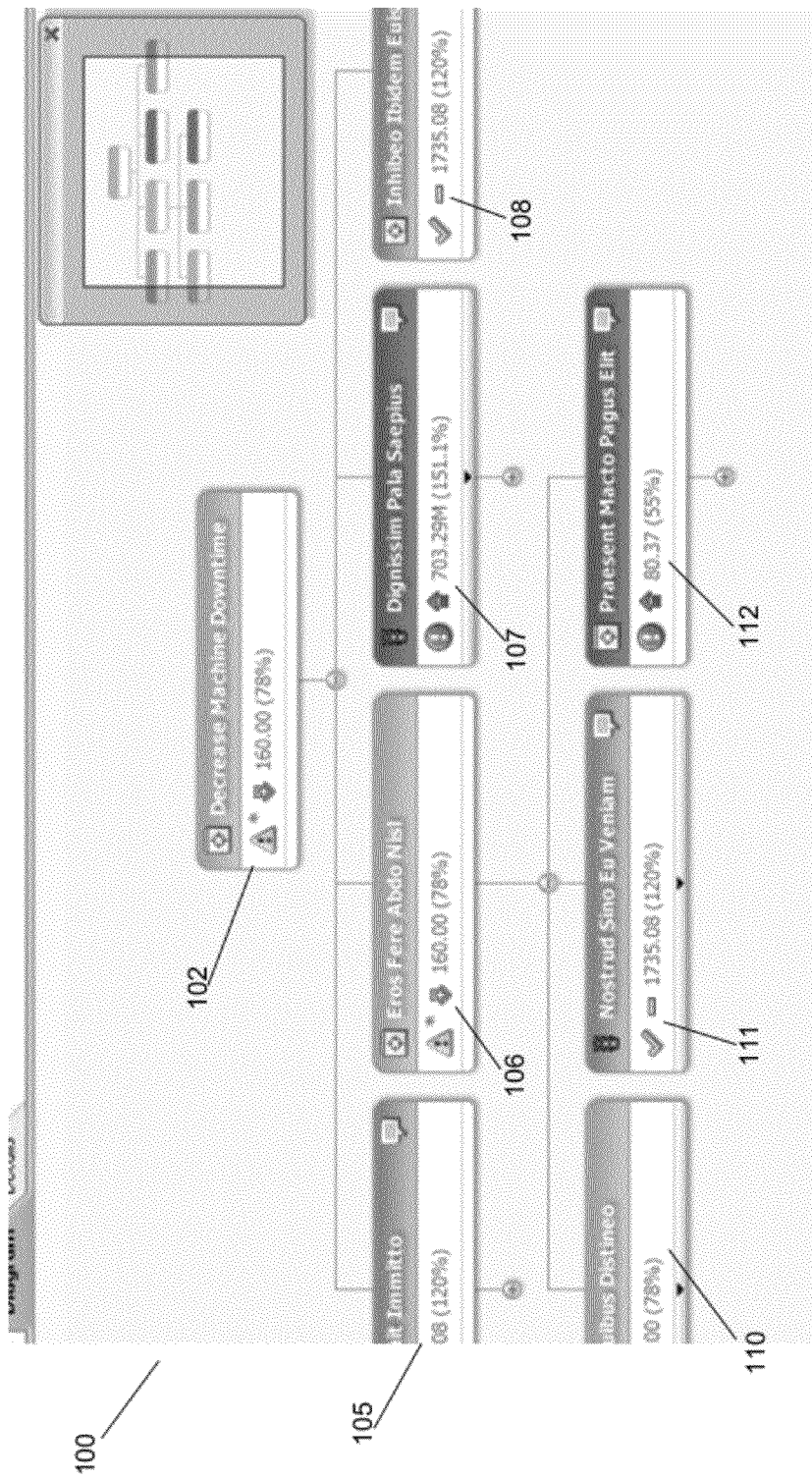
FIG. 1 illustrates a prior art "strategy tree" for a Business Intelligence dashboard.
Figure 2:
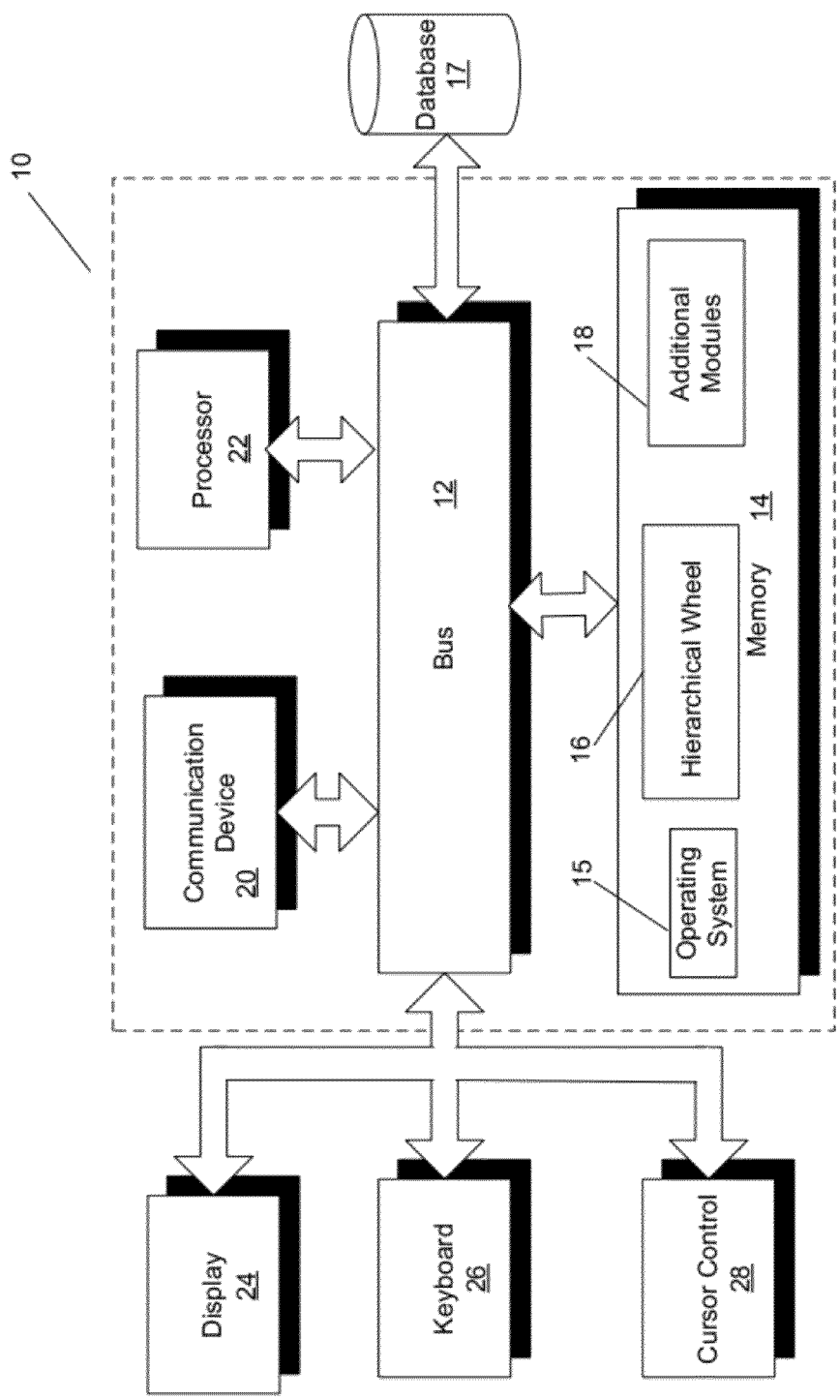
FIG. 2 is a block diagram of a computer system that can implement an embodiment of the present invention.

FIG. 2 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a hierarchical wheel module 16 that displays hierarchical data in the form of an interactive hierarchical wheel disclosed in more detail below. System 10 can be part of a larger system, such as an Business Intelligence ("BI") system or Enterprise Resource Planning ("ERP") system that generates the hierarchical data to be displayed by module 16. Therefore, system 10 will typically include one or more additional functional modules 18 to include the additional functionality. A database 17 may be coupled to bus 12 to provide centralized storage for modules 16 and 18.

Figure 3:
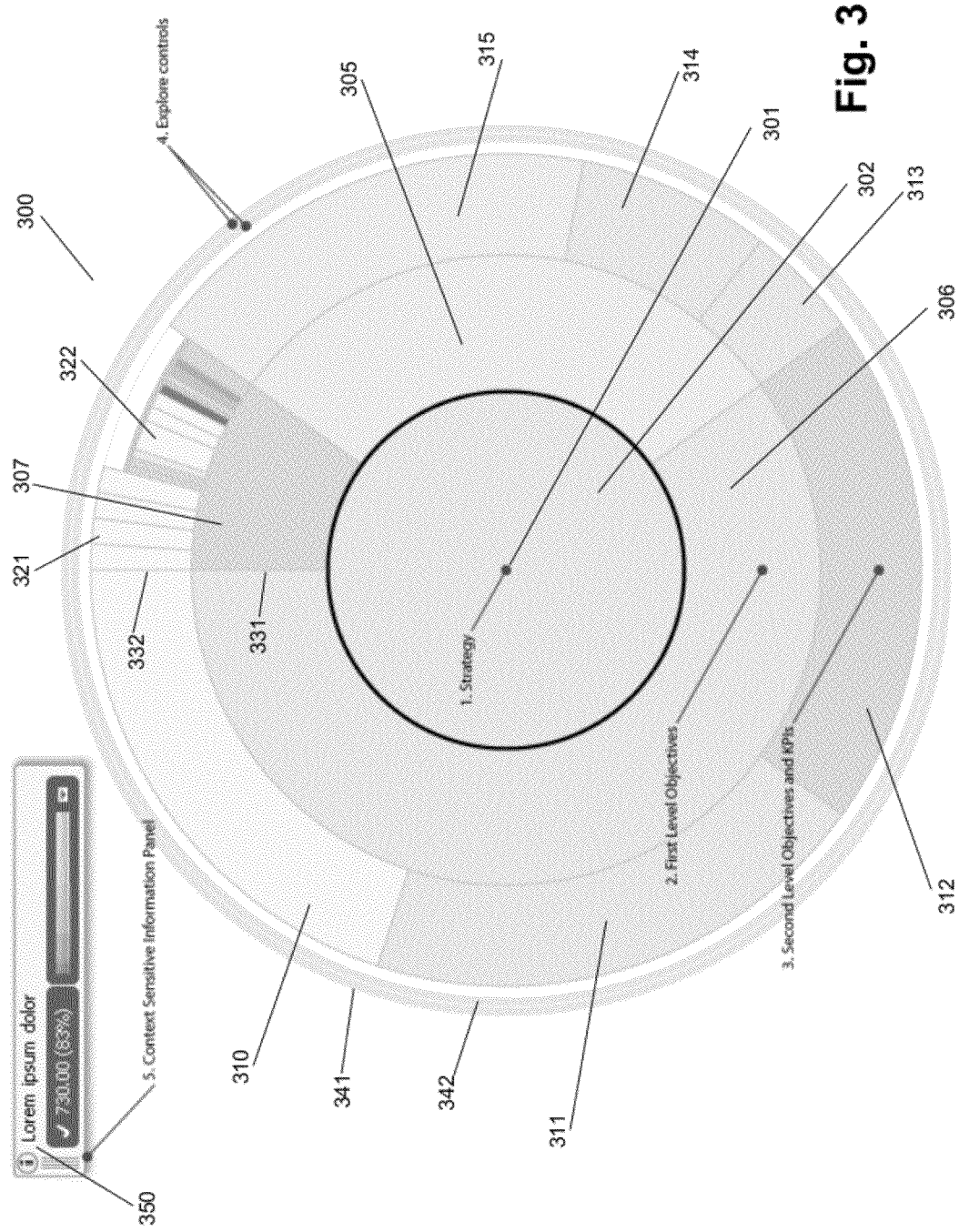
FIG. 3 illustrates a hierarchical data wheel in accordance with one embodiment of the present invention.

FIG. 3 illustrates a hierarchical data wheel 300 in accordance with one embodiment of the present invention. Wheel 300 includes three levels of hierarchical data nodes, with each node beyond the top level node occupying separate concentric rings of the wheel.

The top level or central node (or "strategy node" in a BI implementation) 302 is represented by a circle 302 centrally located around the central axis 301. Multiple first level nodes are represented by segments 305-307 of a first concentric ring or band. The size or area of each segment 305-307 is proportional to the weight (or some assigned measure) of each first level node.

For each first level node that has second level nodes, the second level nodes are represented by segments 310-315 of a second concentric ring or band. The size or area of each segment 310-315 is proportional to the weight of each second level node. Therefore, for example, first level node 306, representing 60% of the top level node 302, branches to second level nodes 310-312, and first level node 305 branches to second level nodes 313-315. Each successive ring has a width that is smaller than the width of the previous ring, so that the "visual" weight of a sub-section does not appear greater than those of the parent(s). For example, the width of the first concentric ring of FIG. 3, represented by the length of line 331, is larger than the width of the second concentric ring, represented by the length of line 332. In one embodiment, each successive width is 75% of the previous width.

If a given first level node does not branch to a second level node, but branches or terminates at the actual data or KPI, or has a mix of second level objectives and KPIs, the KPIs (terminal nodes) are distinguished by indentation from the outer circumference and a heavy line. For example, first level node 307 branches to second level objectives 321 and KPIs 322.

Depending on the desired size, a wheel can display many levels of concentric rings corresponding to node levels. In the example of FIG. 3, wheel 300 shows two levels. At the outer circumference of the wheel are two control rings 341 and 342. Rings 341 and 342 are interactive and could be clicked (as buttons) or otherwise activated by a user to expand (outer ring 341) or collapse (inner ring 342) the levels of wheel 300. Therefore, for example, if ring 341 is activated, a third level of nodes or KPIs (assuming they exist) will be shown. If ring 342 is activated, the second level ring will be collapsed.

A user can interact with wheel 300 by selecting a node using known selection techniques. Here, a selected node is indicated by a black outline. In FIG. 3, top level node 302 has been selected. A context sensitive information panel 350 provides relevant information for a selected node. Each node may be color coded or gray scale coded to indicate its status. For example, for a BI dashboard where the nodes represent objectives, each node may have a status such as error/not started (using graduated shades of red), in progress/50% complete (using graduated shades of gold), or completed (using graduated shades of gray). The status of the top level node is a sum of the statuses of the first level nodes. The status of each first level node is the sum of associated second level nodes, and so on.

Figure 4:
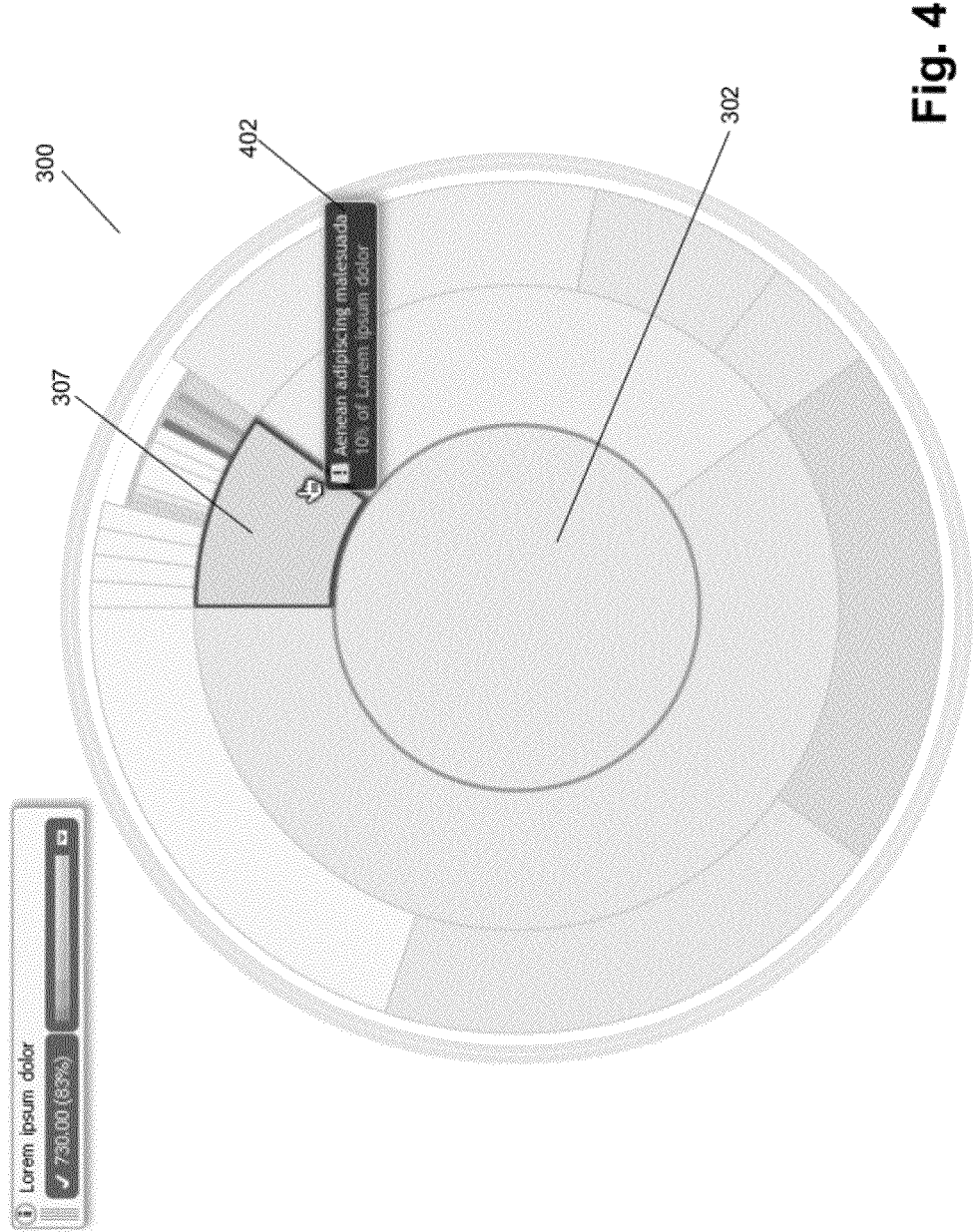
FIG. 4 illustrates the hierarchical data wheel in accordance with one embodiment of the present invention.

When interacting with wheel 300, a user can hover over a node, which highlights that node and generates a rich tooltip. FIG. 4 illustrates hierarchical data wheel 300 in accordance with one embodiment of the present invention. In FIG. 4, a user hovers over node 307, which highlights node 307 through a dark outline and causes it to cast a shadow. Further, all parent nodes are highlighted (i.e., node 302) by a dark outline, thus showing lineage between the selected node and the parent node(s). Rich tooltip 402 shows the name and % (weight) of the parent, and may include a status icon.

Figure 5:
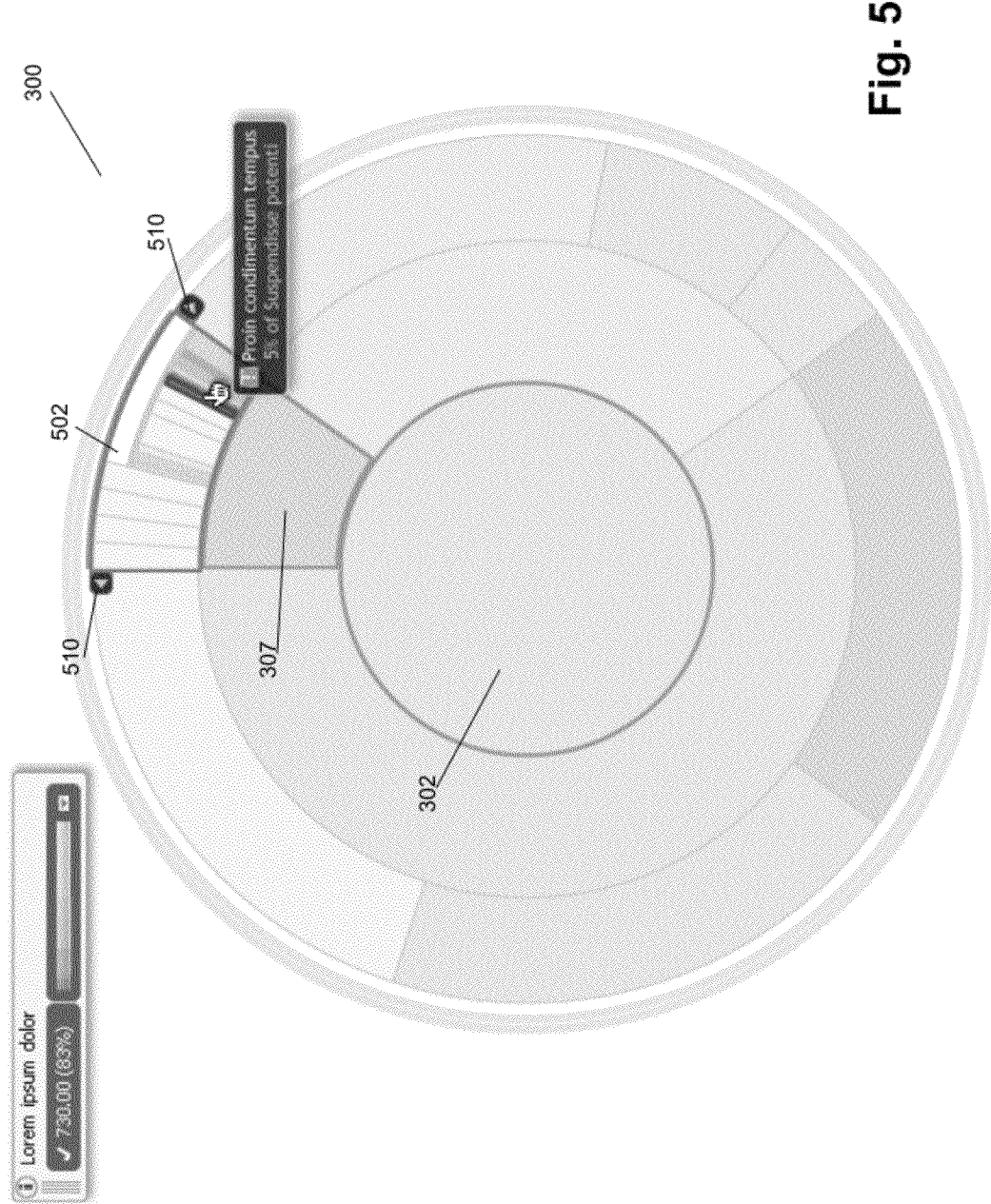
FIG. 5 illustrates the hierarchical data wheel in accordance with one embodiment of the present invention.

FIG. 5 illustrates hierarchical data wheel 300 in accordance with one embodiment of the present invention. As shown in FIG. 5, the user is hovering over a "crowded" section 502 that includes both objectives and KPIs. Section 502, as well as parent nodes 307 and 302 are highlighted. Further, expansion controls 510 appear around the section. Expansion controls 510 in one embodiment will automatically appear when a user hovers over any node or KPI within a crowded section. A crowded section can be defined when any member of that section is less than a predetermined pixel number (e.g., 10 pixels) wide.

Figure 6:
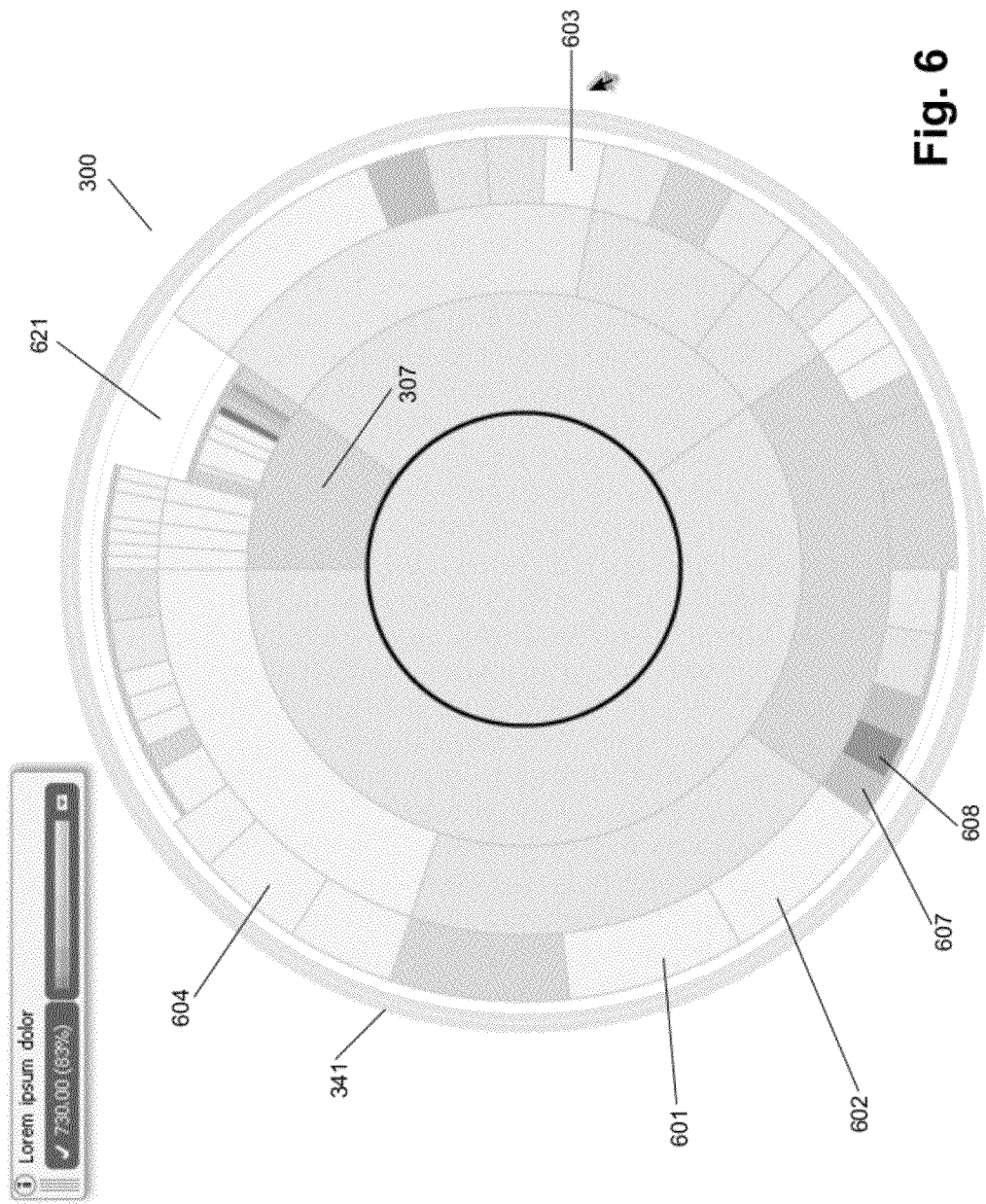
FIG. 6 illustrates the hierarchical data wheel in accordance with one embodiment of the present invention.

FIG. 6 illustrates hierarchical data wheel 300 in accordance with one embodiment of the present invention. The example of FIG. 6, in comparison to FIG. 3, exposes a next node level in the form of an additional concentric ring as a result of a user interacting with expansion ring 341. The additional concentric ring includes third level nodes 601-604, etc., and third level KPIs (terminal nodes) 607, 608, etc. When a first level node, such as node 307, ends in KPIs in the second level, there are no third level nodes or KPIs, so blank sections 621 will appear.

Figure 7:
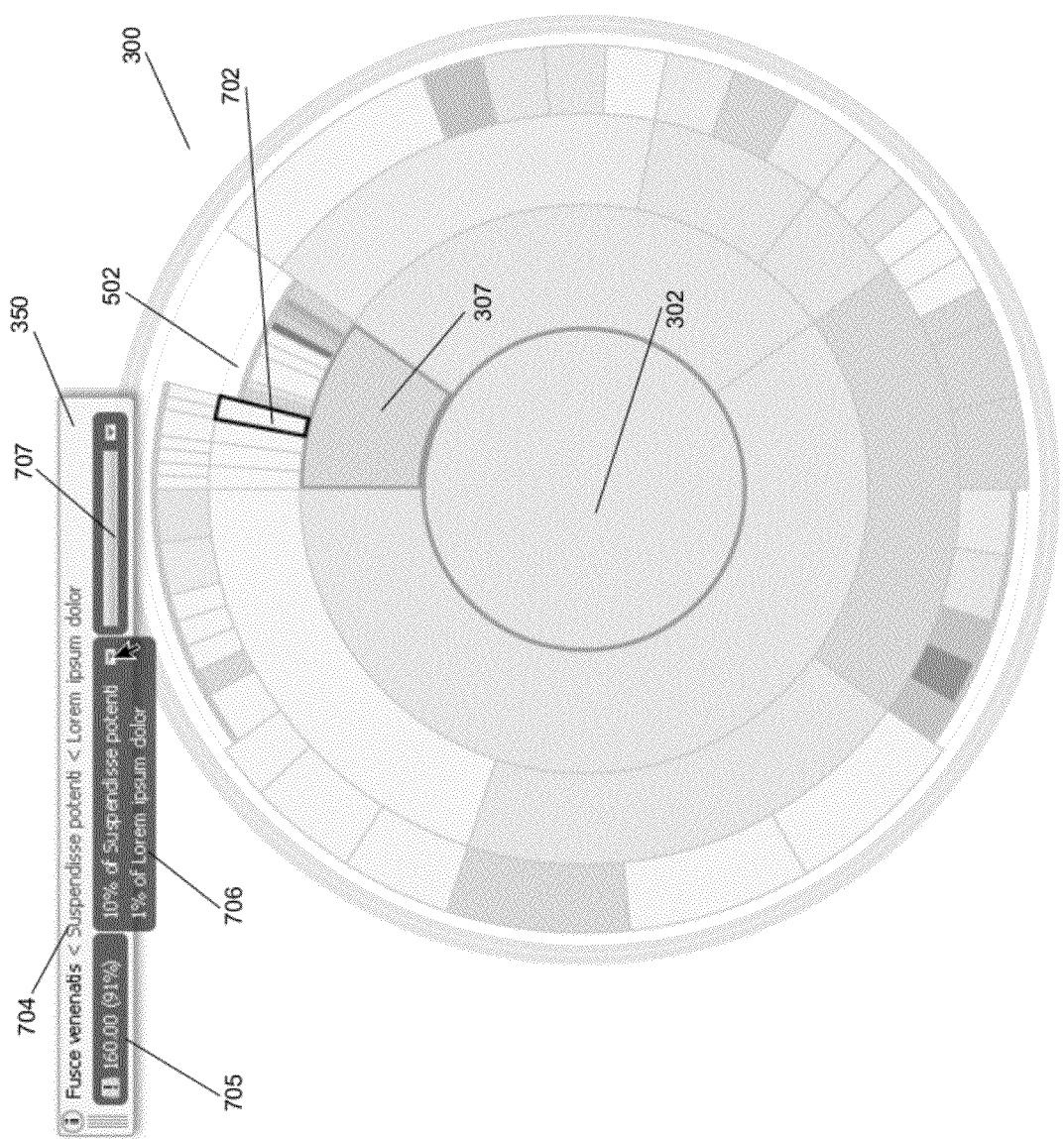
FIG. 7 illustrates the hierarchical data wheel in accordance with one embodiment of the present invention.

FIG. 7 illustrates hierarchical data wheel 300 in accordance with one embodiment of the present invention. In FIG. 7, node 702 from crowded section 502 has been selected, as indicated by the dark line around node 702, as well as parent nodes 307 and 302. Note that expansion controls are not displayed here because the user has moved the cursor out of section 502 to the information panel 350. Information panel 350 shows the title of the selected node as well as its path (in breadcrumb form) at 704. The status and values of selected node 702 is shown at 705. At 706, the percentages of parents at each level are shown. At 707, the status of children in stacked bar form are shown.

Figure 8:
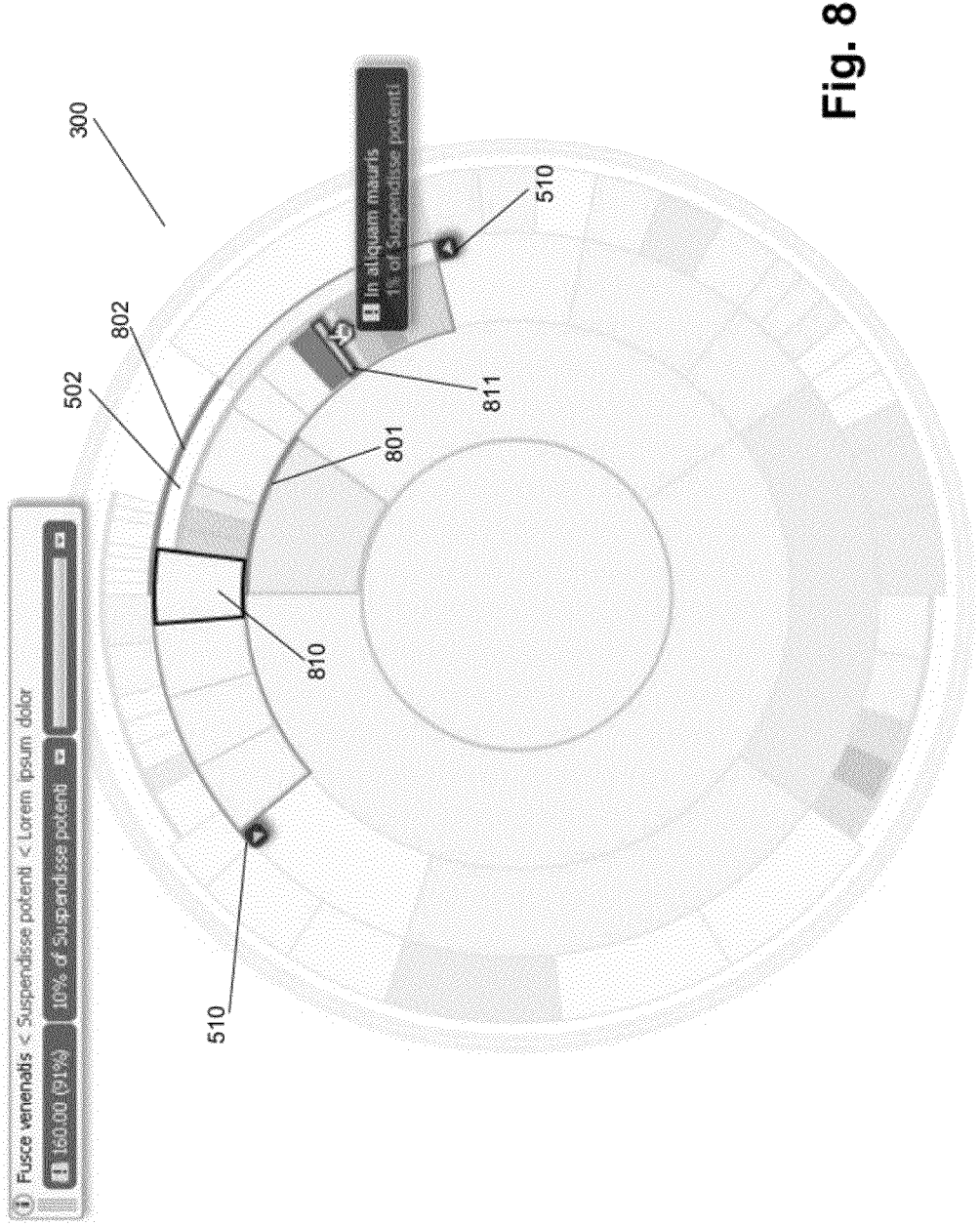
FIG. 8 illustrates the hierarchical data wheel in accordance with one embodiment of the present invention.

FIG. 8 illustrates hierarchical data wheel 300 in accordance with one embodiment of the present invention. In the example of FIG. 8, a user has selected an expansion control 510 of crowded section 502, which causes all members of crowded section 502 to be expanded proportionately so that the smallest member is at least a predetermined size (e.g., 10 pixels wide at its narrowest point). Further, the remainder of wheel 300 is dimmed and inaccessible when the expansion mode is activated. Darkened bars 801 and 802 at the top and bottom of the area provide a reference to the original size by indicating the original section's position in the wheel. The arrows on controls 510 change direction to show that they are now controls to return to a normal (compressed) view. As shown, the previously selected node 810 is still in the selection state, but a user is hovering over a different KPI 811, but has not yet selected (clicked) that KPI.

Figure 9:
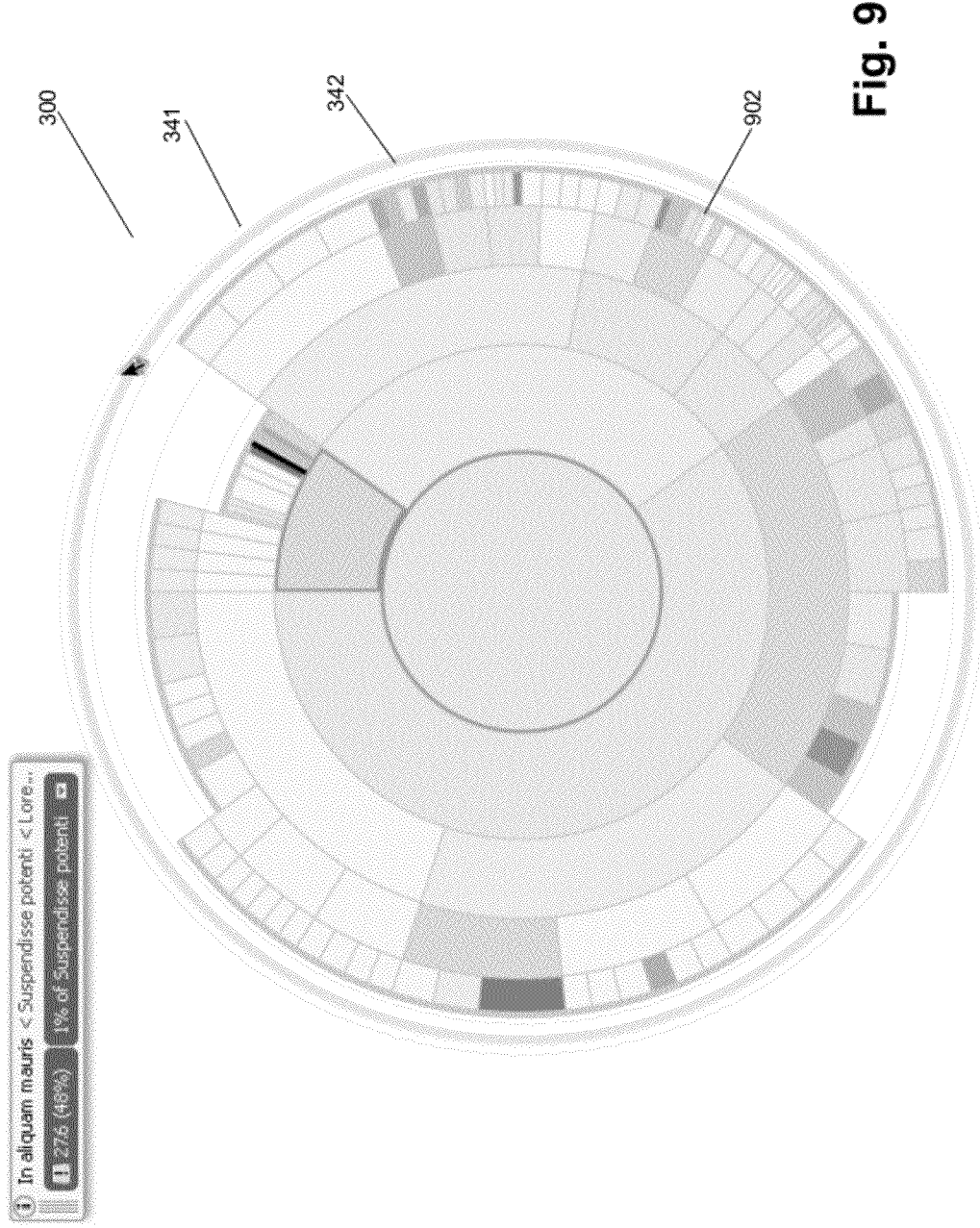
FIG. 9 illustrates the hierarchical data wheel in accordance with one embodiment of the present invention.

FIG. 9 illustrates hierarchical data wheel 300 in accordance with one embodiment of the present invention. In the example of FIG. 9, the user has used control 341 one more time to expand wheel 300 to show fourth level nodes and KPIs. Control 341 is dimmed, indicating that wheel 300 is fully expanded. The outermost elements are either blank, or data elements/KPIs, as indicated by a thick outline 902.

Figure 10:
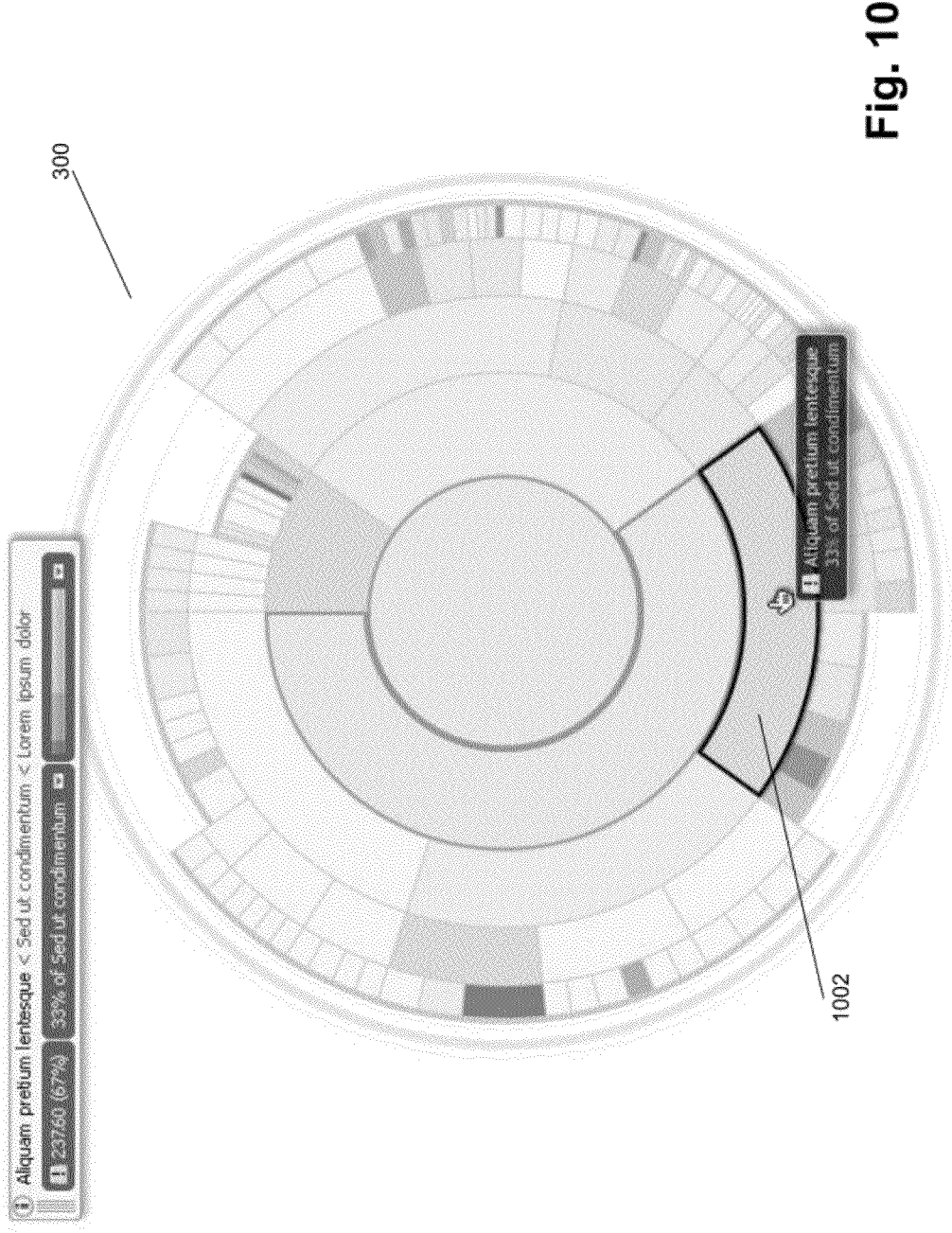
FIG. 10 illustrates the hierarchical data wheel in accordance with one embodiment of the present invention.
Figure 11:
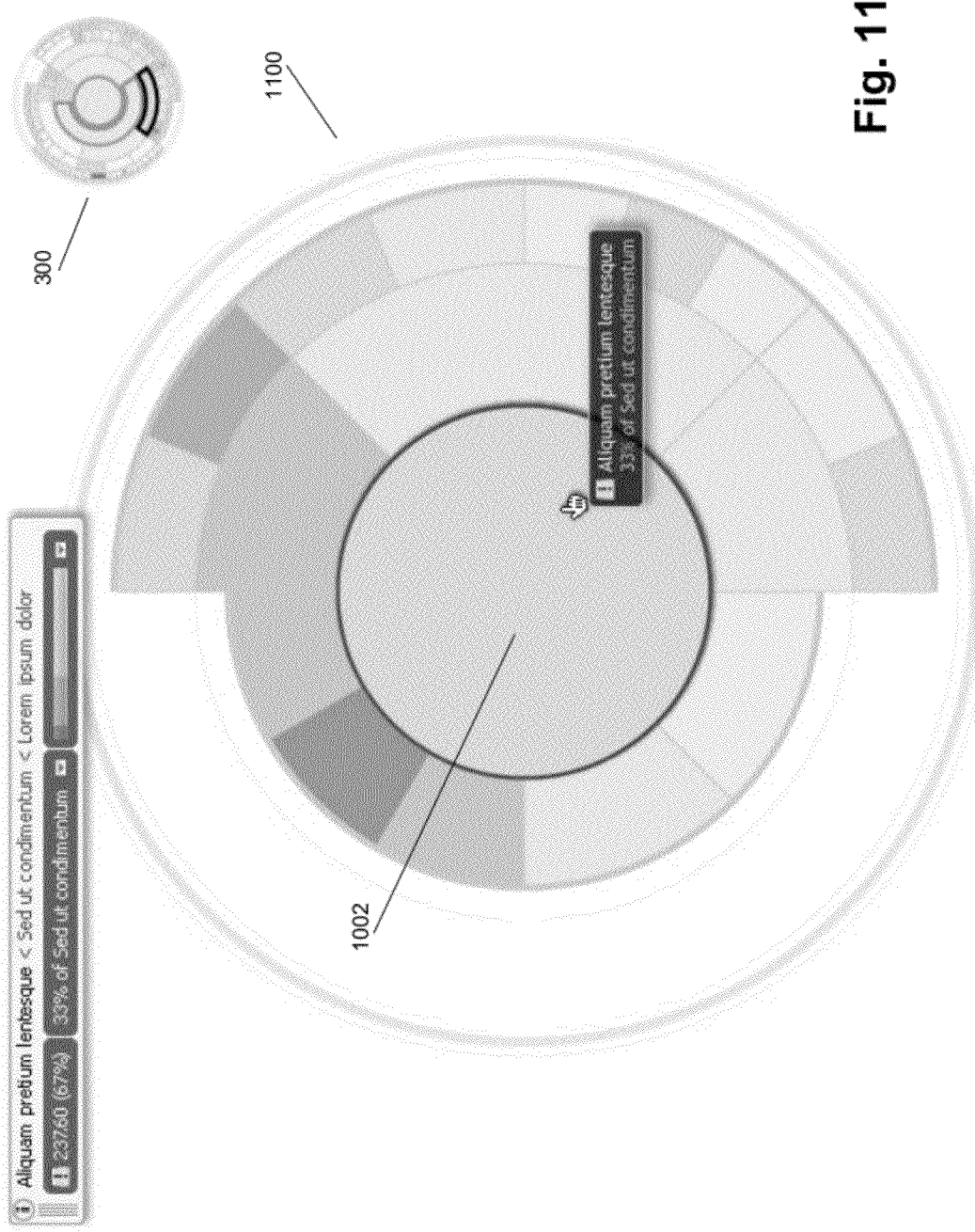
FIG. 11 illustrates a newly generated hierarchical data wheel in accordance with one embodiment of the present invention.

In one embodiment, a new wheel can be launched by double-clicking one of the nodes/objectives. FIG. 10 illustrates hierarchical data wheel 300 in accordance with one embodiment of the present invention. In the example of FIG. 10, the user is first hovering and then indicating a new wheel should be generated by double clicking or otherwise selecting second level objective/node 1002. FIG. 11 illustrates a newly generated hierarchical data wheel 1100 in accordance with one embodiment of the present invention. Wheel 1100 is based on second level node 1002 as the center node. Otherwise, wheel 1100 is interactive in the same way as wheel 300. The previous wheel 300 shrinks as a reference in the upper-right corner, and can be selected by a user to return to original wheel 300, and is used to show the lineage of the current root. In another embodiment, a full size version of the previous wheel 300 is displayed, or other methods can be used to show the lineage of the current root.

Figure 12:
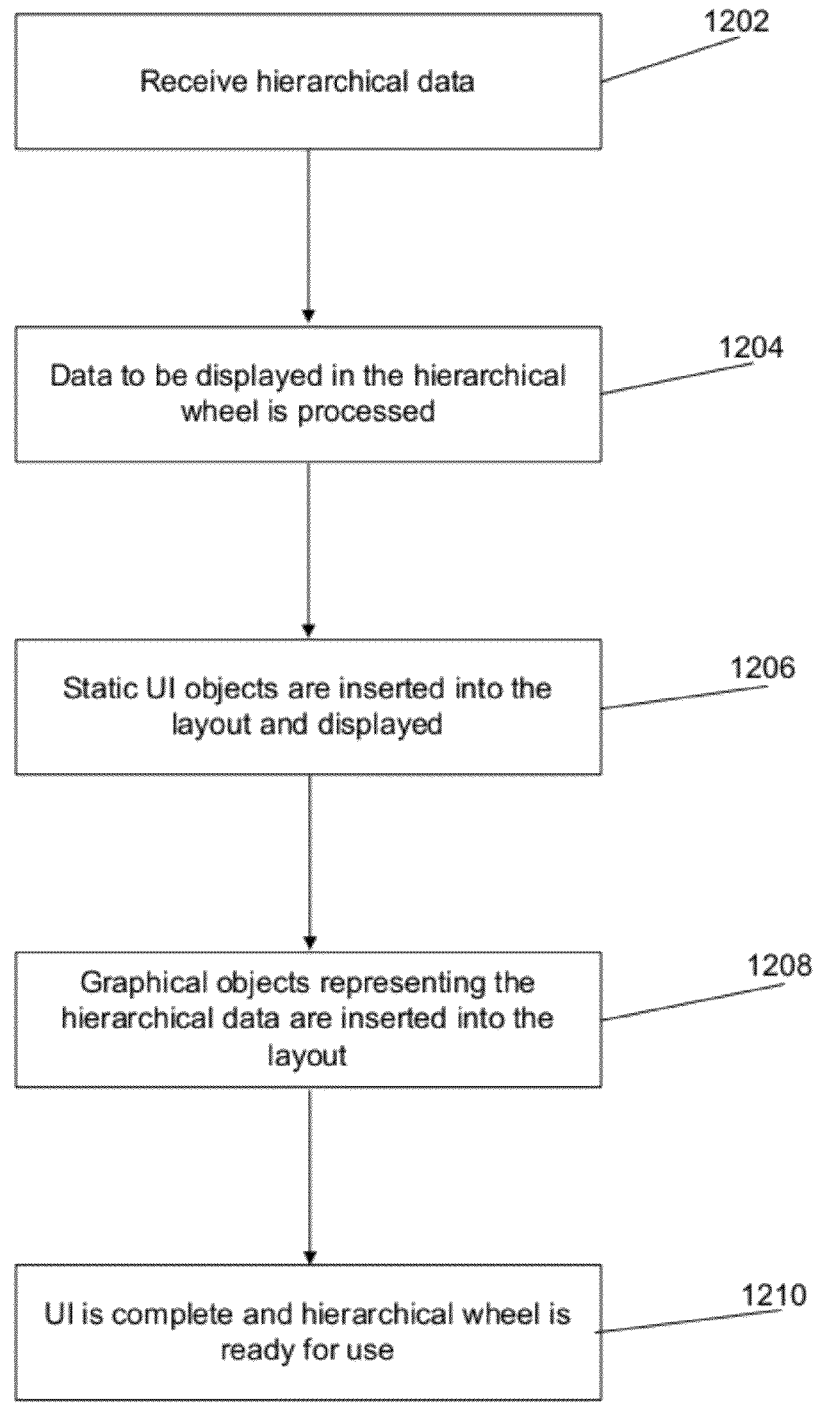
FIG. 12 is a flow diagram of the functionality of the hierarchical wheel module when generating and displaying a hierarchical wheel in response to receiving hierarchical data in accordance with one embodiment.

FIG. 12 is a flow diagram of the functionality of hierarchical wheel module 16 when generating and displaying a hierarchical wheel in response to receiving hierarchical data in accordance with one embodiment. In one embodiment, the functionality of the flow diagram of FIG. 12 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1202, hierarchical wheel 16 receives hierarchical data from module 18 or any other data source. The hierarchical data includes data for the structure and relationships of nodes, as well as values associated with each node.

At 1204, data for the nodes which will be displayed is processed/parsed. For example, in wheel 300, the nodes displayed include the top, and the next two levels in the hierarchy.

At 1206, static elements of the user interface are inserted and displayed in the diagram. These are user interface elements required to navigate levels of the wheel, and to get other details about the nodes. These may include information panel 350 and control rings 341 and 342.

At 1208, the hierarchical wheel itself is displayed based on the data parsed at 1204. Layout rules are applied in the display of the hierarchy. The nodes of the wheel are placed in a logical order to ensure consistency (for example clockwise from the top), and levels of the hierarchy are depicted in a weighted fashion so that nodes that are higher in the hierarchical structure generally occupy more area. The logical order provides a consistent and predictable flow of nodes in a level, while weighting the radius of each level ensures that nodes at lower levels of the hierarchy (towards the outer edge of the wheel) do not appear larger than nodes at higher levels (towards the center of the wheel). In one embodiment, successive levels (i.e., rings) are 75% of the increased radius (or width of the ring) of the previous level so as to minimize the visual weight of the lower level nodes compared to their parent's visual weight.

At 1210, the wheel and all interactive user interface elements are ready for interaction.

As disclosed, hierarchical data is generated and displayed in the form of a hierarchical wheel. The wheel has a high density of information and allows the representation of a large number of nodes in the hierarchy in a small surface. This allows a user looking at the visualization to quickly understand the position, status and relevance of a node in the hierarchy. Further, the wheel provides intuitive interaction features which require minimal gestures from the user.

In comparison with tree diagrams, relative weight/importance of nodes/objectives and data/KPIs is clearly represented as a proportion of a ring. In a tree, the importance of a node or leaf may be indicated by a number, but that is very difficult to visualize when the number of nodes and leaves is high. Further, in the wheel, relationships between descendent objectives and higher-level objectives and strategy is clearly shown at a glance, as opposed to tracing lineage in a large tree diagram. Further, the wheel is generally easier to navigate than a tree because it does not require zooming, panning and the use of a bird's eye view.

Embodiments can be used in any environment where hierarchical data must be displayed. Although some of the disclosed examples are relevant to BI data, it may be used, for example, to show an organization chart and the relative importance of each organization and sub-team. It may be used to show the same hierarchical structure along different dimensions. For example, the hierarchical wheel could be used to show an organization chart where the size of each node is relative to either the head-count (first dimension) or the revenues (second dimension). In another example, the wheel could be use to show a file system where the weight would be the size of the file or directory.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A graphical hierarchical data wheel for displaying hierarchical nodes, the wheel generated by a processor, the wheel comprising:

a top level circle generated by the processor on a central axis of the wheel representing a top level node;

a first concentric ring generated by the processor adjacent to the top level circle and comprising a plurality of first level segments, each representing a first level node, wherein a size of each first level segment is proportional to a weight of the corresponding first level node;

a second concentric ring generated by the processor having a larger radius than the first concentric ring and adjacent to the first concentric ring, and comprising a plurality of second level segments, each representing a second level node, wherein a size of each of the second level segments is proportional to the weight of the corresponding second level node;
a first outer circumference control ring for collapsing a displayed level; and
a second outer circumference control ring for expanding a level not currently displayed; and
a darkened outline around a selected node and all parent nodes of the selected node to display a lineage between the selected node and the parent nodes;
wherein each concentric ring has a width, and each successive ring has a smaller width than the previous ring.

2. The graphical hierarchical data wheel of claim 1, further comprising:
showing a percentage of the selected node for a parent node at each hierarchal level.

3. The graphical hierarchical data wheel of claim 1, further comprising:
an indented segment representing data corresponding to a node, wherein the node is a terminal node or a node with no child nodes.

4. The graphical hierarchical data wheel of claim 1, wherein the data wheel represents business intelligence data, and the first and second nodes are objectives, and the top level node is a strategy.

5. The graphical hierarchical data wheel of claim 4, wherein the nodes are objectives and the data is a key performance indicator.

6. The graphical hierarchical data wheel of claim 1, further comprising expansion controls for a crowded section of a concentric ring.

7. The graphical hierarchical data wheel of claim 1, wherein the segments are color coded to indicate a status of the corresponding nodes.

8. A computer implemented method of displaying hierarchical nodes, the method comprising:
generating by a processor a hierarchical data wheel comprising:
a top level circle on a central axis of the wheel representing a top level node;
a first concentric ring adjacent to the top level circle and comprising a plurality of first level segments, each representing a first level node, wherein a size of each first level segment is proportional to a weight of the corresponding first level node;
a second concentric ring having a larger radius than the first concentric ring and adjacent to the first concentric ring, and comprising a plurality of second level segments, each representing a second level node, wherein a size of each of the second level segments is proportional to the weight of the corresponding second level node;
a first outer circumference control ring for collapsing a displayed level; and
a second outer circumference control ring for expanding a level not currently displayed; and
a darkened outline around a selected node and all parent nodes of the selected node to display a lineage between the selected node and the parent nodes;
wherein each concentric ring has a width, and each successive ring has a smaller width than the previous ring.

9. The computer implemented method of claim 8, the wheel further comprising:
showing a percentage of the selected node for a parent node at each hierarchal level.

10. The computer implemented method of claim 8, the wheel further comprising:
an indented segment representing data corresponding to a node, wherein the node is a terminal node or a node with no child nodes.

11. The method of claim 8, wherein the data wheel represents business intelligence data, and the first and second nodes are objectives, and the top level node is a strategy.

12. The method of claim 11, wherein the nodes are objectives and the data is a key performance indicator.

13. A non-transitory computer readable medium having instructions stored thereon that, when executed by a processor, causes the processor to generate a graphical hierarchical data wheel for displaying hierarchical nodes, the wheel comprising:
a top level circle on a central axis of the wheel representing a top level node;
a first concentric ring adjacent to the top level circle and comprising a plurality of first level segments, each representing a first level node, wherein a size of each first level segment is proportional to a weight of the corresponding first level node;
a second concentric ring having a larger radius than the first concentric ring and adjacent to the first concentric ring, and comprising a plurality of second level segments, each representing a second level node, wherein a size of each of the second level segments is proportional to the weight of the corresponding second level node;
a first outer circumference control ring for collapsing a displayed level; and
a second outer circumference control ring for expanding a level not currently displayed; and
a darkened outline around a selected node and all parent nodes of the selected node to display a lineage between the selected node and the parent nodes;
wherein each concentric ring has a width, and each successive ring has a smaller width than the previous ring.

14. The computer readable medium of claim 13, the wheel further comprising:
showing a percentage of the selected node for a parent node at each hierarchal level.

15. The computer readable medium of claim 13, the wheel further comprising:
an indented segment representing data corresponding to a node, wherein the node is a terminal node or a node with no child nodes.

16. The computer readable medium of claim 13, wherein the data wheel represents business intelligence data, and the first and second nodes are objectives, and the top level node is a strategy.

17. The computer readable medium of claim 16, wherein the nodes are objectives and the data is a key performance indicator.

* * * * *

UNITED STATES PATENT AND TRADEMARK OFFICE
CERTIFICATE OF CORRECTION

| | | |
|---|---|---|
| PATENT NO. | : 8,230,339 B2 | |
| APPLICATION NO. | : 12/715677 | |
| DATED | : July 24, 2012 | |
| INVENTOR(S) | : Watanabe et al. | |

It is certified that error appears in the above-identified patent and that said Letters Patent is hereby corrected as shown below:

On the Title page, Item (56) "Other Publications", line 7, delete "Vizualization" and insert -- Visualization --, therefor.

Signed and Sealed this
Sixth Day of November, 2012

David J. Kappos
*Director of the United States Patent and Trademark Office*